UNITED STATES PATENT OFFICE.

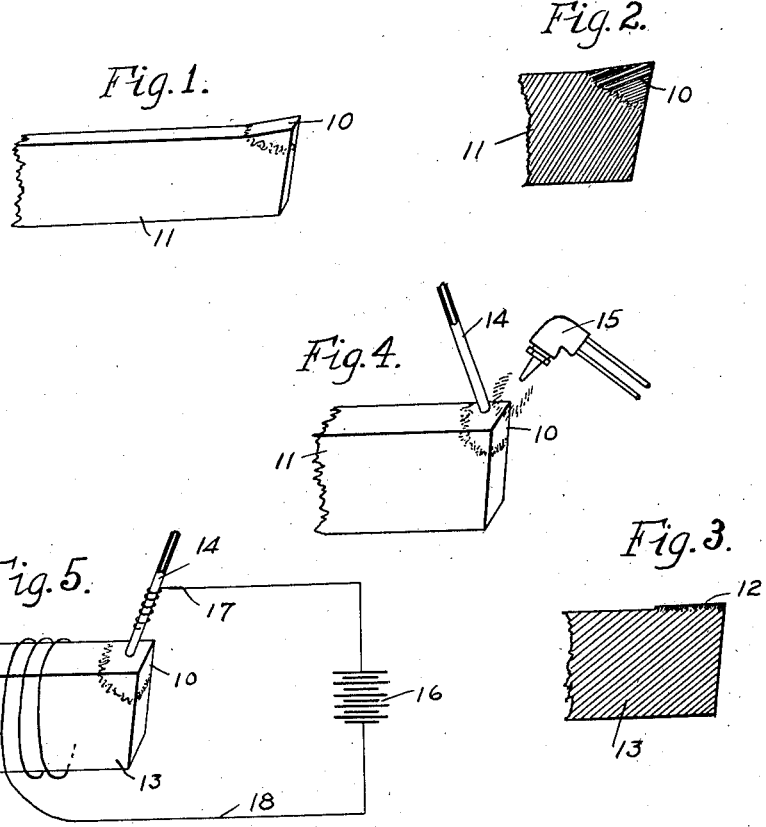

EDGAR I. WENGER, OF GLENELLYN, ILLINOIS.

HIGH-SPEED TOOL.

1,424,536.　　　　Specification of Letters Patent.　　Patented Aug. 1, 1922.

Application filed March 20, 1920. Serial No. 367,481.

*To all whom it may concern:*

Be it known that I, EDGAR I. WENGER, a citizen of Canada (who has declared his intention of becoming a citizen of the United States), and residing at Glenellyn, county of Du Page, and State of Illinois, have invented certain new and useful Improvements in a High-Speed Tool, of which the following is a specification.

This invention relates particularly to a lathe tool for high speed work, although, of course, it may be applied to tools for any desired use. Among the objects of the invention are to simplify and reduce the cost of tools of this kind; to produce a tool with the minimum quantity of high speed steel; and to utilize the shank of a tool of cheaper material as the base for a cutting tip or edge of high grade tool steel. Other objects will appear hereinafter. The invention consists in the novel product, and in the method of producing it.

In the accompanying drawing, Fig. 1 is a view illustrating a tip applied to the shank of a tool utilizing the method of this invention; Fig. 2 is a sectional view of such a tip; Fig. 3 is a sectional view illustrating a tip made for a speed cutting or scraping tool as produced by this method; Fig. 4 illustrates the method of producing the tip with an oxyacetylene or similar torch; and Fig. 5 illustrates the method employed when using a welding arc.

The present method of making high speed tools is to take a soft steel shank and on the tip or cutting edge of it, to weld a piece of high speed steel. Of course, it takes considerable time, trouble and expense to do this, and the present invention is designed and intended to overcome these objections by doing away entirely with the separate block of high speed steel, and instead to convert the tip or cutting edge of the steel shank into a hard or high speed steel by adding thereto tungsten, molybdenum, nickel, manganese, chromium, or whatever combination is necessary for the class of work in hand, by first getting the soft steel into a molten condition by the use of a blow torch or an electric arc, and then adding any other metal or metals in the proportion desired.

In practice, a tip 10 of the desired character of high speed steel is formed as an integral part of a soft steel shank 11 by the employment of this method, or a thin layer 12 of high speed steel is formed as a part of a shank 13, as illustrated by Fig. 4.

This method can be carried out most readily and accurately by making up a tube or pencil 14, and either having it constituted of or filled up with the other metal or metals which it is desired to add to the shank of the tool in the proportion desired; in heating the steel of the shank until it is in a molten condition; and in then applying the pencil to the molten shank until the metal thereof is worked into the molten metal of the shank so as to form an alloy. This method may be employed by using a blow torch 15 of the oxyacetylene type, or any other suitable heating torch, or the metal may be heated by means of an electric arc, as illustrated in Fig. 5 in which the source of electric current 16 has one terminal 17 which is applied to a pencil 14, and another terminal 18 which is applied to the shank 19. The application of the pencil to the shank causes an arc, in the well known manner, and the pencil of material 14 can be worked into the tip of the shank to the desired extent, as it becomes molten.

By this method, a high speed tip or cutting edge can be formed on the shank of any steel tool by applying to it a metal or metals in the proper quantities or combination; there is no loss or waste of material; the tip is more firmly and integrally united with the shank than where a separate piece is welded on; and any different variety of steel or alloy may be formed on the same shank by adding the proper materials thereto in this way.

A high speed type may be formed on the end of a shank as shown by Figs. 1 and 2 or a cutting edge or surface may be built up as indicated by Fig. 3. After the tip or cutting edge is formed it may be tempered or hardened in any well known manner, if desired or necessary.

I claim:

1. A cutting tool having a metal shank with its cutting edge modified by the interpenetration of an alloying metal.

2. A tool comprising a shank of low grade steel with a cutting edge modified by the interpenetration of an alloying metal.

EDGAR I. WENGER.